(12) United States Patent
Chen et al.

(10) Patent No.: US 9,680,274 B2
(45) Date of Patent: Jun. 13, 2017

(54) ELECTRICAL CONNECTOR HAVING INSULATIVE HOUSING AND METHOD OF MAKING THE SAME

(71) Applicant: FOXCONN INTERCONNECT TECHNOLOGY LIMITED, Grand Cayman (KY)

(72) Inventors: Ming-Ching Chen, New Taipei (TW); Shun-Jung Chuang, New Taipei (TW); Wei-Ta Tseng, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 79 days.

(21) Appl. No.: 14/705,217

(22) Filed: May 6, 2015

(65) Prior Publication Data
US 2015/0325951 A1 Nov. 12, 2015

(30) Foreign Application Priority Data

May 7, 2014 (TW) .............................. 103116171 A
May 7, 2014 (TW) .............................. 103116173 A

(51) Int. Cl.
| H01R 13/648 | (2006.01) |
|---|---|
| H01R 43/24 | (2006.01) |
| H01R 13/642 | (2006.01) |
| H01R 24/60 | (2011.01) |
| H01R 13/6585 | (2011.01) |
| H01R 43/16 | (2006.01) |
| H01R 13/11 | (2006.01) |

(Continued)

(52) U.S. Cl.
CPC ............. *H01R 43/24* (2013.01); *H01R 13/11* (2013.01); *H01R 13/2442* (2013.01); *H01R 13/405* (2013.01); *H01R 13/642* (2013.01); *H01R 13/6585* (2013.01); *H01R 24/60* (2013.01); *H01R 43/16* (2013.01); *H01R 13/6581* (2013.01); *H01R 13/6582* (2013.01); *H01R 13/6591* (2013.01); *H01R 2107/00* (2013.01); *Y10T 29/49222* (2015.01)

(58) Field of Classification Search
USPC ....................................... 439/607.57, 607.58
See application file for complete search history.

(56) References Cited

U.S. PATENT DOCUMENTS

| 6,409,543 B1 | 6/2002 | Astbury et al. |
| 7,097,506 B2 | 8/2006 | Nakada |

(Continued)

FOREIGN PATENT DOCUMENTS

| CN | 203193000 | 9/2013 |
| TW | M253969 | 12/2004 |

*Primary Examiner* — Tho D Ta
(74) *Attorney, Agent, or Firm* — Wei Te Chung; Ming Chieh Chang

(57) ABSTRACT

An electrical connector (100) includes a shielding plate (1), a base portion (2) insert molded with the shielding plate and defining two rows of passageways (21), two rows of terminals (3) affixed to the base portion, and an insulative housing (4) over molded with the base portion. The two rows of passageways extend through the base portion along a front-to-back direction and exposed completely upwardly and downwardly. Each terminal includes a contacting beam (31) having a contacting portion (311). The shielding plate is located between the two rows of terminals.

17 Claims, 12 Drawing Sheets

(51) Int. Cl.
  H01R 13/24     (2006.01)
  H01R 13/405    (2006.01)
  H01R 107/00        (2006.01)
  H01R 13/6581       (2011.01)
  H01R 13/6582       (2011.01)
  H01R 13/6591       (2011.01)

(56) References Cited

U.S. PATENT DOCUMENTS

| | | |
|---|---|---|
| 7,682,199 B2 | 3/2010 | Ahn et al. |
| 8,052,461 B2 * | 11/2011 | Wang .................. H01R 4/2433 439/405 |
| 8,109,795 B2 | 2/2012 | Lin et al. |
| 8,262,411 B2 | 9/2012 | Kondo |
| 8,461,465 B2 | 6/2013 | Golko et al. |
| 8,684,769 B2 | 4/2014 | Kao et al. |
| 8,784,134 B2 | 7/2014 | Wu et al. |
| 8,794,981 B1 | 8/2014 | Rodriguez et al. |
| 2013/0117470 A1 | 5/2013 | Terlizzi et al. |
| 2013/0330976 A1 | 12/2013 | Simmel et al. |
| 2015/0171562 A1 * | 6/2015 | Gao .................. H01R 13/6582 439/345 |
| 2015/0244110 A1 * | 8/2015 | Ju .................... H01R 13/6585 439/607.01 |
| 2015/0325957 A1 | 11/2015 | Liao et al. |

* cited by examiner

ELECTRICAL CONNECTOR HAVING INSULATIVE HOUSING AND METHOD OF MAKING THE SAME

BACKGROUND OF THE INVENTION

1. Field of the Invention

The present invention relates to an electrical connector, and more particularly to a USB (Universal Serial Bus) connector adapted for being normally and reversely mating with a mating connector and a method of making the same.

2. Description of Related Art

U.S. Pat. No. 8,684,769 issued on Apr. 1, 2014 discloses a socket connector and a mating plug connector. The socket connector includes an upper housing having an upper tongue, a set of upper contacts arranged upon the upper tongue, a lower housing having a lower tongue, a set of lower contacts arranged upon the lower tongue, and a shielding plate between the upper housing and the lower housing. The upper housing and the lower housing are then inserted into a bracket. The plug connector includes a plug housing having a pair of tongue portions for fixing two rows of plug contacts and a shielding sheet between the two rows of terminals.

It is hard to insert mold the contacts with the housing via molds or insert the contacts through the housing. Structurally the plug connector and the socket connector are not strong.

A strengthened and easily manufactured USB connector is desired.

SUMMARY OF THE INVENTION

Accordingly, an object of the present invention is to provide an electrical connector having a solid construction and easy to manufacture.

In order to achieve the object set forth, an electrical connector includes a shielding plate, a base portion insert molded with the shielding plate and defining two rows of passageways, two rows of terminals affixed to the base portion, and an insulative housing over molded with the base portion. The two rows of passageways extend in the base portion along a front-to-back direction, and exposed completely upwardly and downwardly, respectively. Each terminal includes a body portion accommodated in a corresponding passageway, a soldering portion, and a contacting beam having a contacting portion. The shielding plate is located between the two rows of terminals.

A method of manufacturing an electrical connector includes the steps of punching a shielding plate and two rows of terminals, insert molding a base portion on the shielding plate and defining two rows of passageways exposed completely upwardly and downwardly, assembling the terminals into the passageways, and over molding an insulative housing on the base portion. The base portion defines two rows of passageways accommodating the terminals and covered by the insulative housing.

The two rows of passageways extend in the base portion along the front-to-back direction and are exposed completely upwardly and downwardly. The terminals are easy to be assembled to the base portion. The step of over molding firmly fix the terminals and strengthen the construction of the electrical connector.

Other objects, advantages and novel features of the invention will become more apparent from the following detailed description when taken in conjunction with the accompanying drawings.

DETAILED DESCRIPTION OF THE PREFERRED EMBODIMENT

Figure 1:
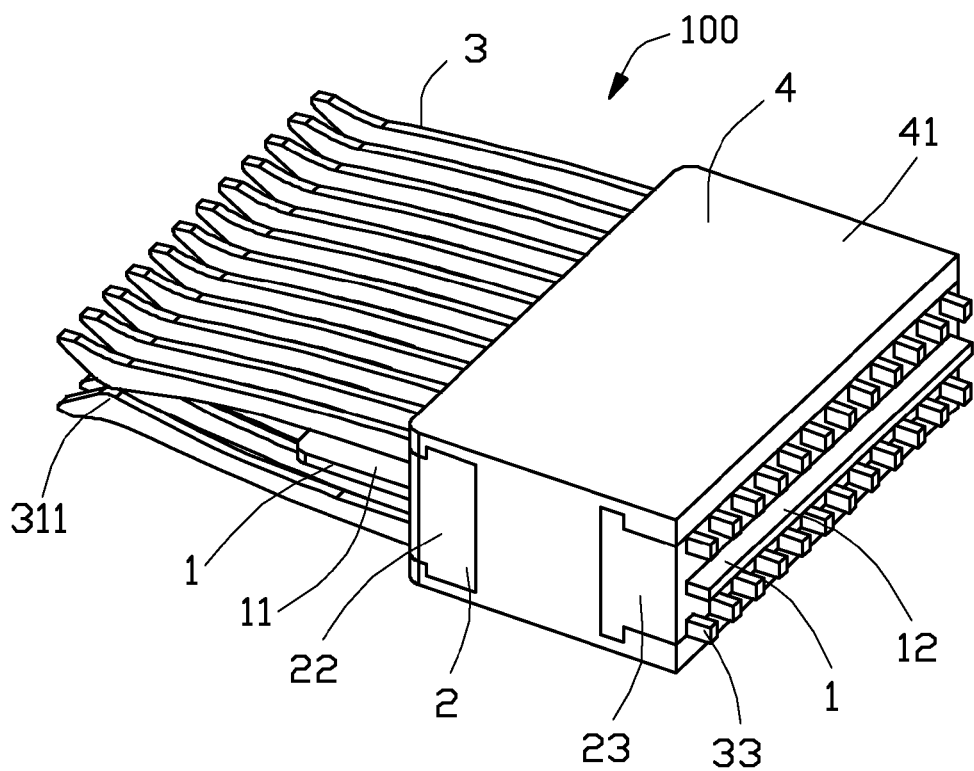
FIG. 1 is an assembled perspective view showing an electrical connector in accordance with a first embodiment of the present invention.
Figure 2:
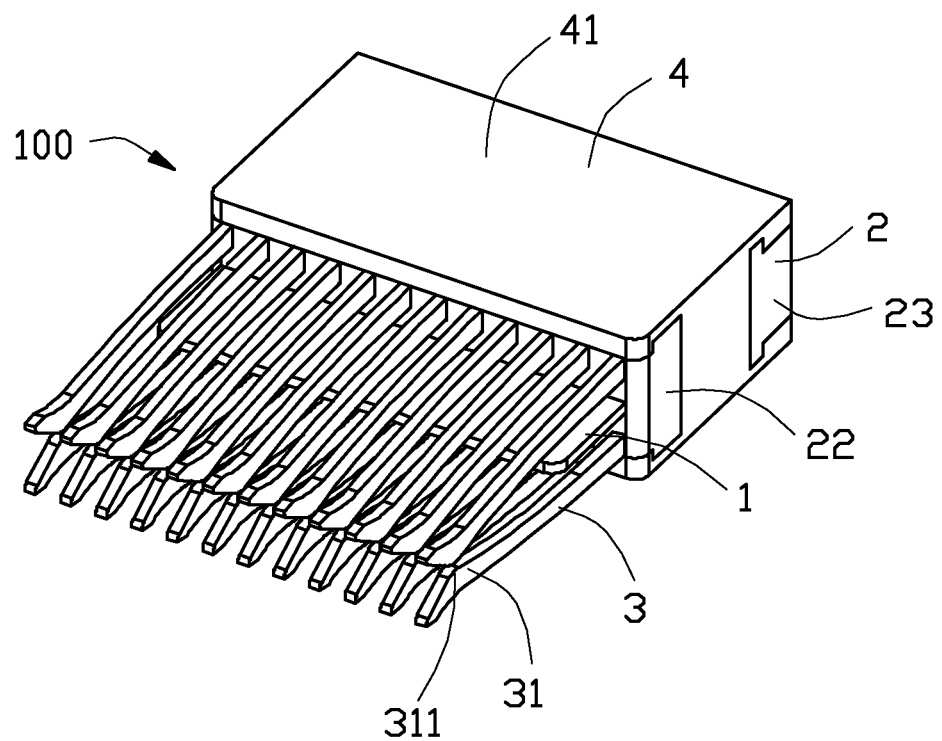
FIG. 2 is another assembled perspective view similar to FIG. 1, taken from another aspect.
Figure 3:
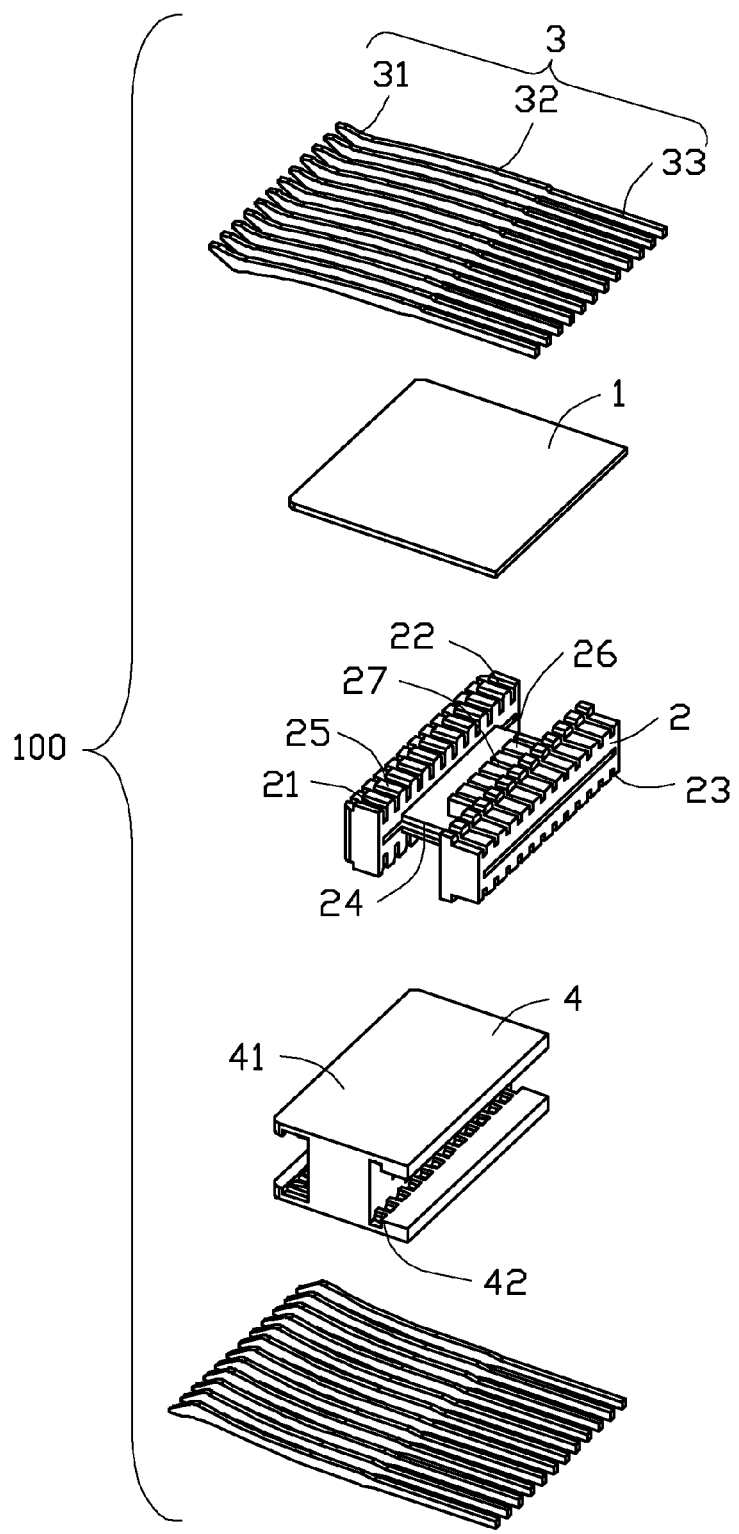
FIG. 3 is an exploded perspective view showing the electrical connector shown in FIG. 1.
Figure 4:
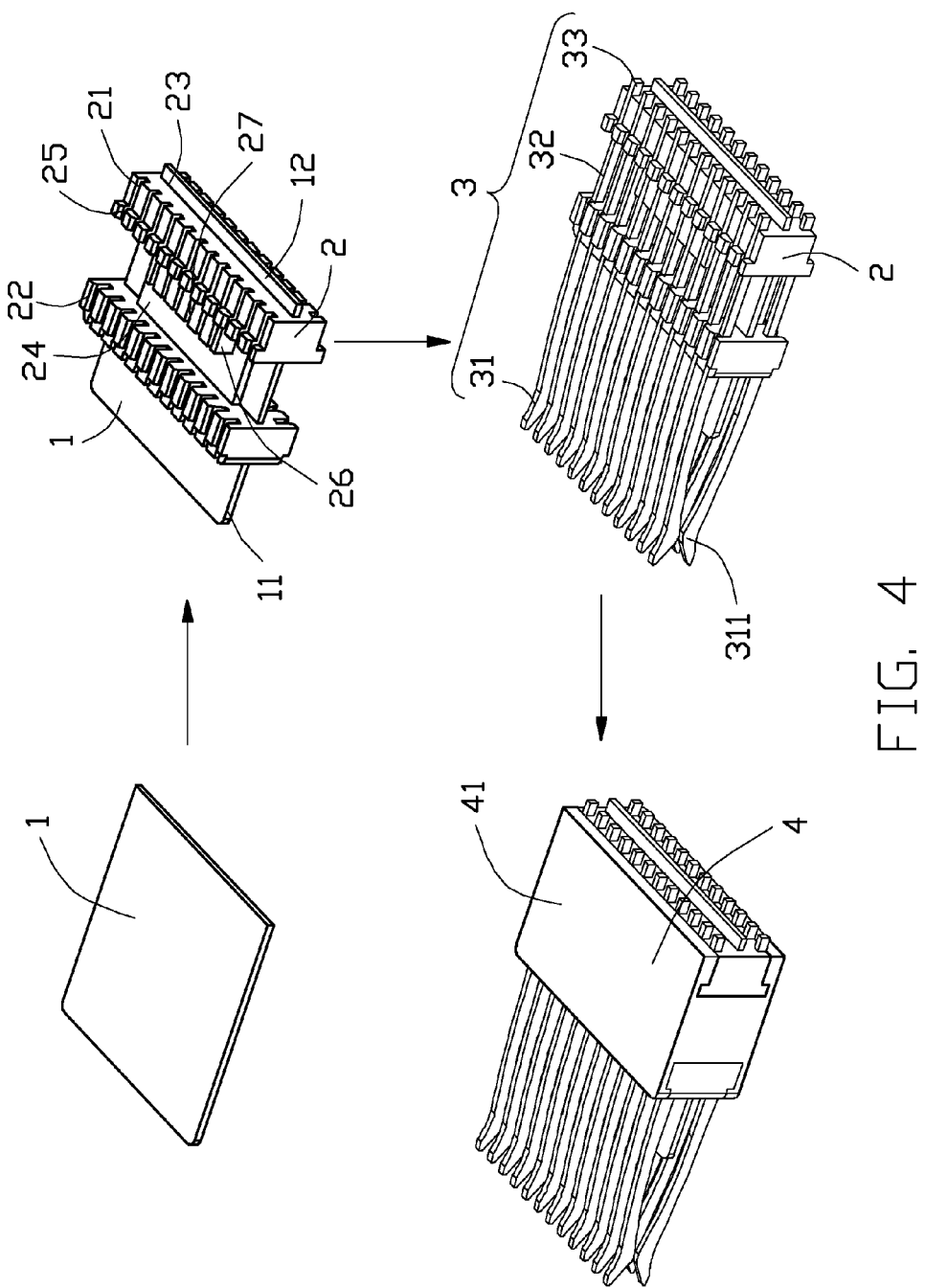
FIG. 4 is a perspective view showing a process of manufacturing the electrical connector.

Reference will now be made in detail to the preferred embodiment of the present invention. Referring to FIGS. 1-4, in a first embodiment, an electrical connector 100 refers to a plug connector and comprises a shielding plate 1 made from a metal plate, a base portion 2, two rows of terminals 3 and an insulative housing 4. One row of the terminals 3 conversely correspond to the other row of the terminals 3 for allowing the electrical connector 100 to be normally and reversely inserted into a mating socket.

The base portion 2 defines two rows of passageways 21 extending through the base portion 2 along a front-to-back direction and exposed completely upwardly and downwardly respectively for allowing assembling the terminals 3 along an top-to-bottom direction. The base portion 2 includes a pair of divided portions 22, 23 arranged along a front-to-back direction and a connecting portion 24 connecting with the pair of divided portions 22, 23. The connecting portion 24 is divided into upper and lower pieces to sandwich the shielding plate 1. Each divided portion 22, 23 is formed with two rows of ribs 25. Each passageway 21 is defined between two adjacent ribs 25. The connecting portion 24 is formed with a plurality of protrusions 26 and a plurality of recesses 27 alternating with the protrusions 26 and communicating with the passageways 21.

Each terminal 3 includes a body portion 32, a soldering portion 33 and a contacting beam 31 cantilevered forwardly from the body portion 32 and having a contacting portion 311. Each contacting portion 311 of one row of the terminals 3 projects toward corresponding contacting portion 311 of the other row of the terminals 3.

The insulative housing 4 comprises a pair of covering portions 41 covering on upper and lower faces of the base portion 2 for at least partially, better totally, covering the passageways 21. Each covering portion 41 has a projection 42 engaging with the passageways 21.

A method of manufacturing the electrical connector 100 comprises the steps of punching the shielding plate 1 and two rows of terminals 3, insert molding the base portion 2 on the shielding plate 1, and assembling the terminals 3 into the passageways 21 along the top-to-bottom direction, optionally along a front-to-back direction, after insert molding. Finally, the insulative housing 4 is over molded on the base portion 2 and at least partially, better totally, covering the passageways 21. Punching the terminals 3 could happen before or after the step of insert molding.

The shielding plate 1 is located between the two rows of the terminals 3. The shielding plate 1 has a front portion 11 extending forwardly from the base portion 2 and positioned between the two rows of contacting beams 31 of the terminals 3 and disposed behind the contacting portions 31. The shielding plate 1 has a tail 12 extending rearwardly from the base portion 2 and disposed between two rows of soldering portions 33.

The terminals 3 are easy to be assembled into the passageways 21. The step of insert molding and the step of over molding firmly fix the terminals 3 and strengthen the construction of the electrical connector 100.

Referring to FIGS. 5-8, in a second embodiment, an electrical connector 100' refers to a receptacle connector and comprises a shielding plate 1' made from a metal plate, a base portion 2', two rows of terminals 3' and an insulative housing 4'. One row of the terminals 3' conversely correspond to the other row of the terminals 3' for allowing the electrical connector 100' to be normally and reversely inserted into a mating socket.

The shielding plate 1' is formed with a pair of resisting portions 13' and a tail 12' extending rearwardly.

The base portion 2' defines two rows of passageways 21' extending along a front-to-back direction and exposed completely upwardly and downwardly respectively. The base portion 2' is formed with two rows of ribs 25'. Each passageway 21' is defined between two adjacent ribs 25'. The base portion 2' has a pair of recesses 27' defined at opposite sides thereof.

Each terminal 3' includes a body portion 32', a soldering portion 33' and a contacting beam 31' extending forwardly from the body portion 32' and having a contacting portion 311'. The contacting portion 311' of upper row of the terminals 3' exposed upwardly. The contacting portion 311' of lower row of the terminals 3' exposed downwardly. Punching the terminals 3' could happen before or after the step of insert molding.

The insulative housing 4' comprises a rear portion 44' and a flat front portion 45' extending forwardly from the rear portion 44'. The rear portion 44' and a flat front portion 45' is formed into a stepped configuration.

A method of manufacturing the electrical connector 100' comprises the steps of punching the shielding plate 1' and two rows of terminals 3', insert molding the base portion 2' on the shielding plate 1', and assembling the terminals 3' into the passageways 21' along either top-to-bottom direction (preferably) or front-to-back direction after insert molding. Finally, the insulative housing 4' is over molded on the base portion 2' together with the terminals 3'.

The pair of resisting portions 13' of the shielding plate 1' are exposed outwardly from the recesses 27' to latch with corresponding structures of a mating connector for grounding. The tail 12' of the shielding plate 1' extends rearwardly from the insulative housing 4'.

Figure 5:
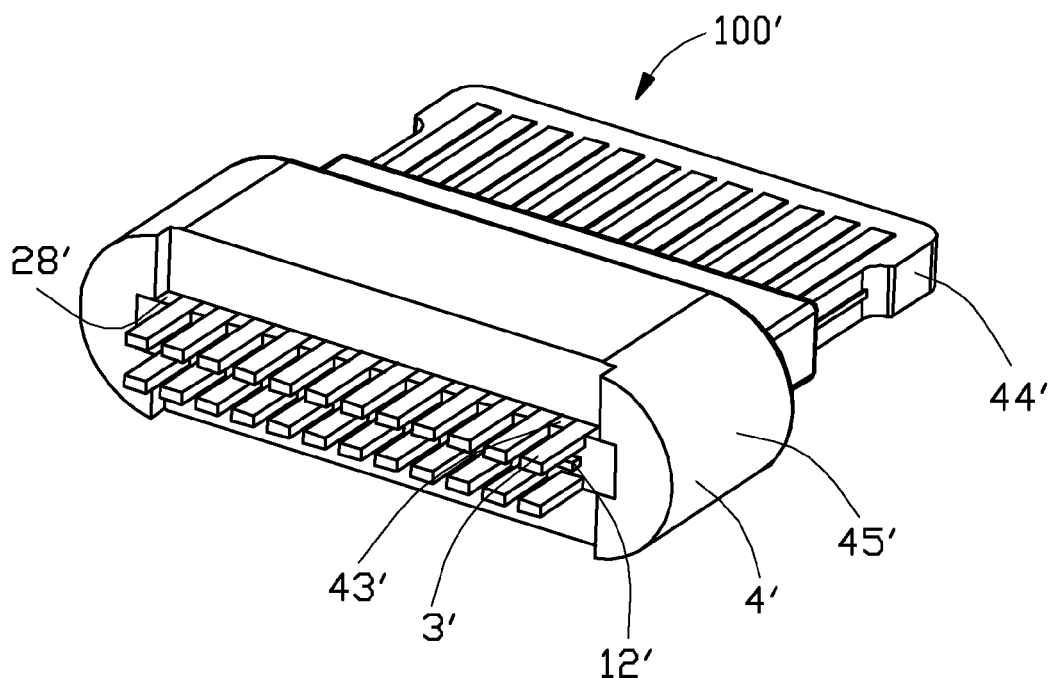
FIG. 5 is an assembled perspective view showing an electrical connector in accordance with a second embodiment of the present invention.
Figure 6:
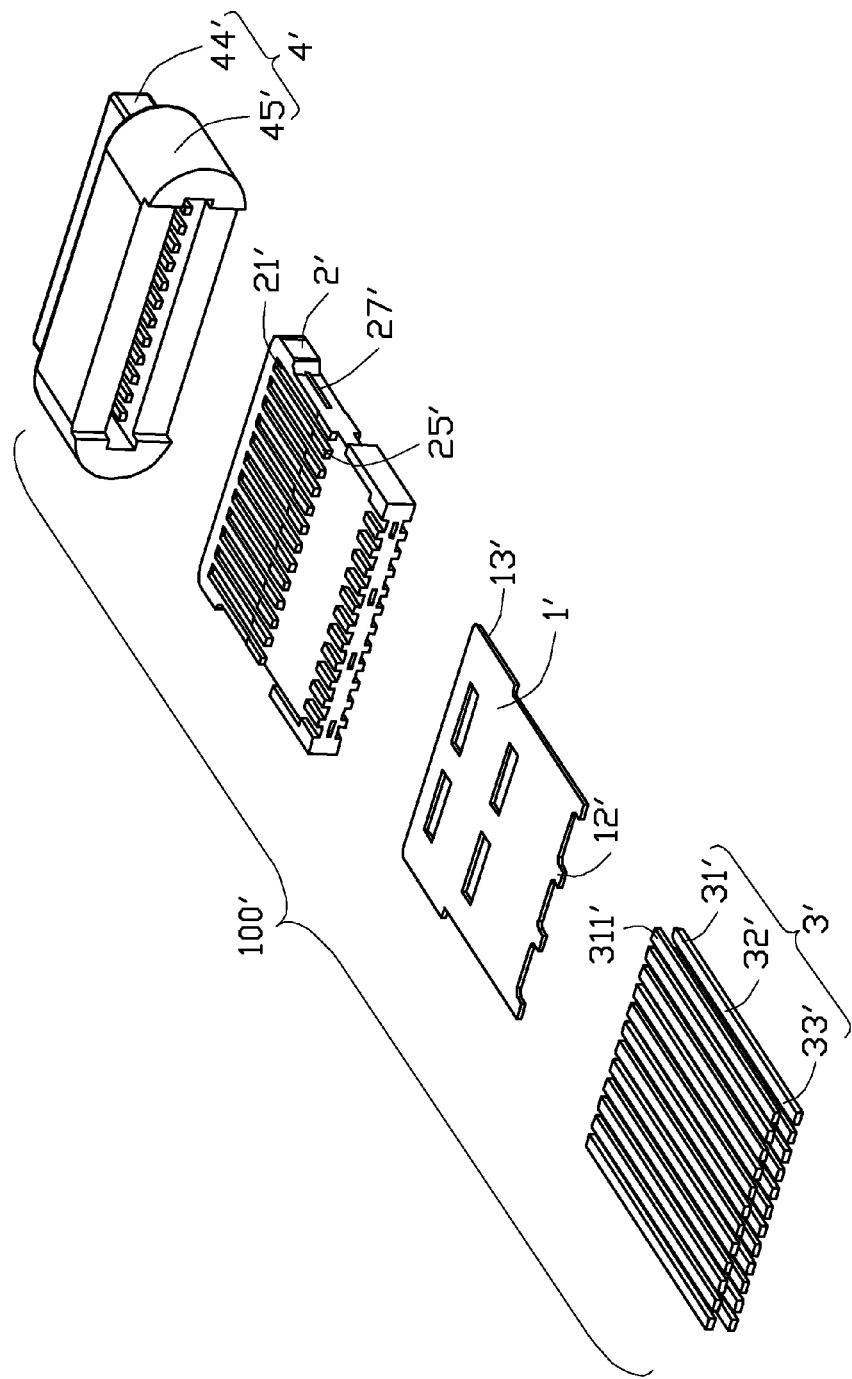
FIG. 6 is an exploded perspective view showing the electrical connector in accordance with the second embodiment the present invention.
Figure 7:
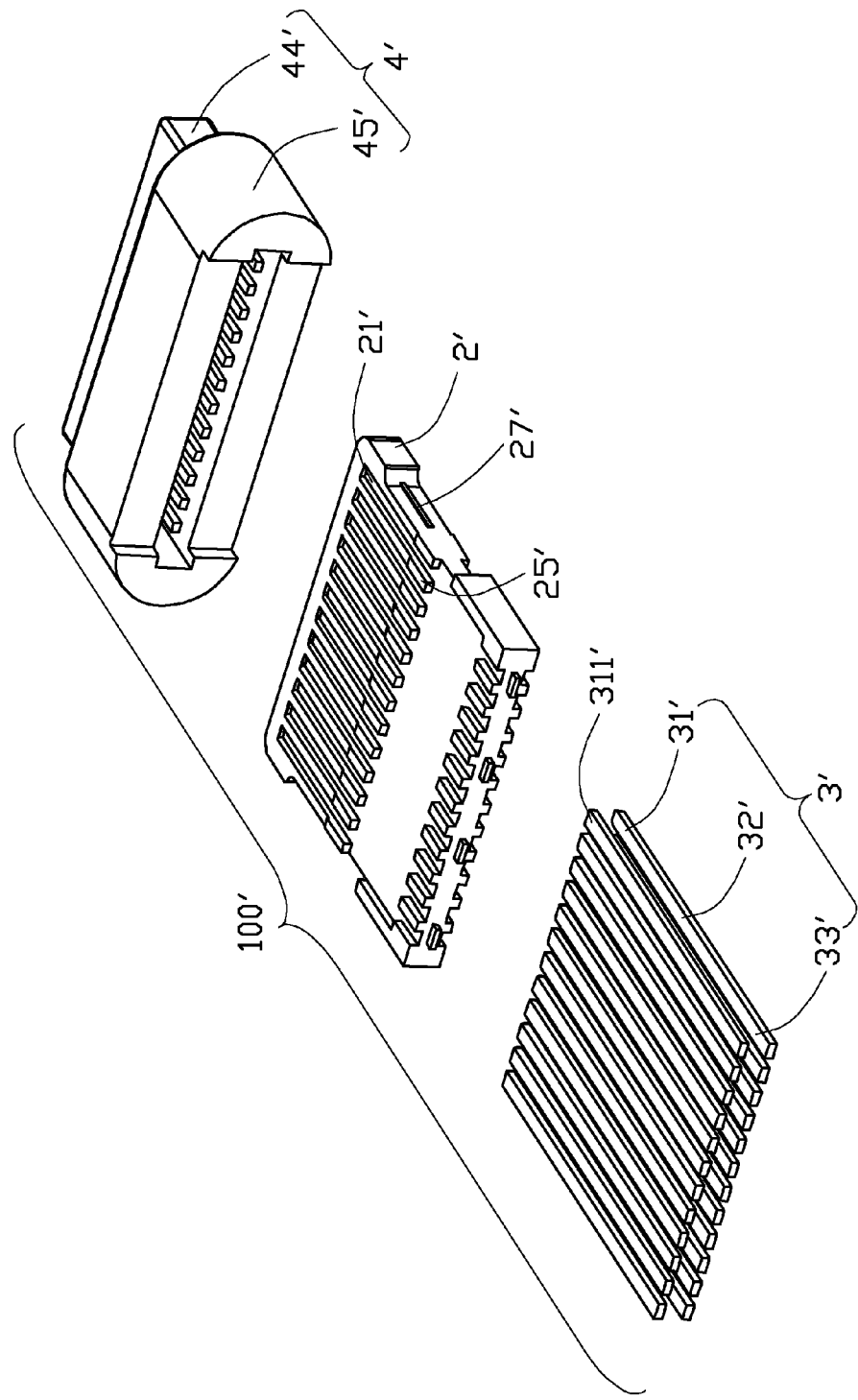
FIG. 7 is a partly exploded perspective view showing the electrical connector shown in FIG. 5, when the shielding plate is insert molded with the base portion.
Figure 8:
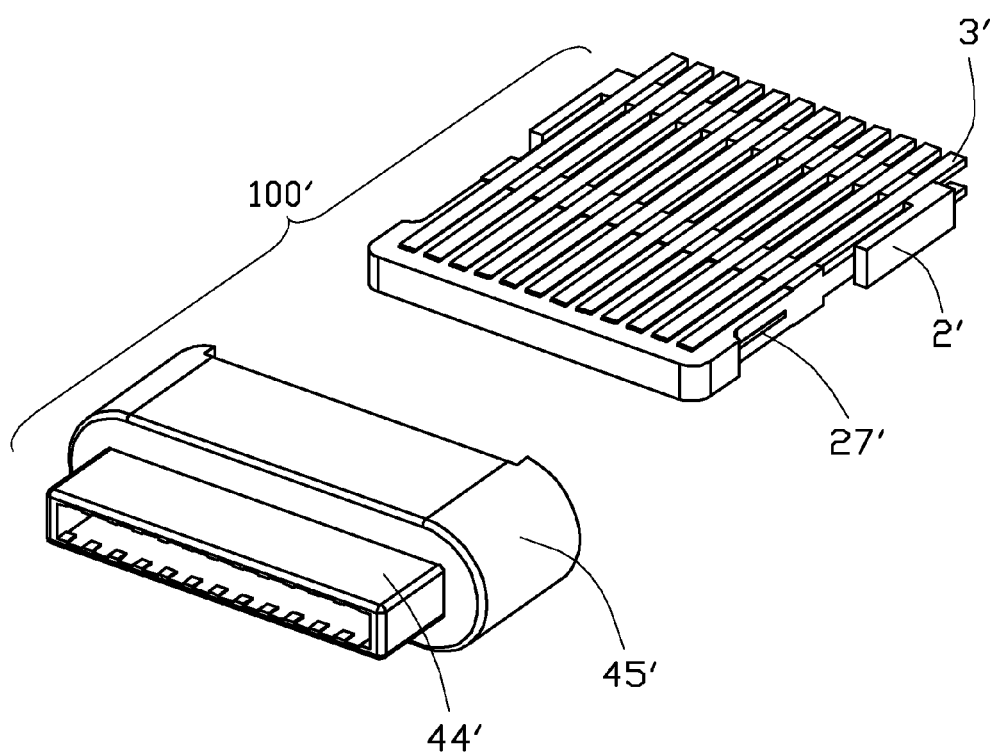
FIG. 8 is a partly exploded perspective view showing the electrical connector shown in FIG. 5, when the shielding plate and the terminals are affixed to the base portion.

Referring to FIG. 5, a rear face of the base portion 2' is at least partially flush with a rear face of the insulative housing 4' for fixing molds at vertical plane. The base portion 2' defines a plurality of maintaining faces 28' at upper and lower faces thereof for supporting molds. The rear face of the insulative housing 4' recessed forwardly to form a hollow 43'. The maintaining faces 28' are exposed outwardly from the insulative housing 2' and located in the hollow 43'. The maintaining faces 28' are flush with the terminals 3' at horizontal plane.

Figure 9:
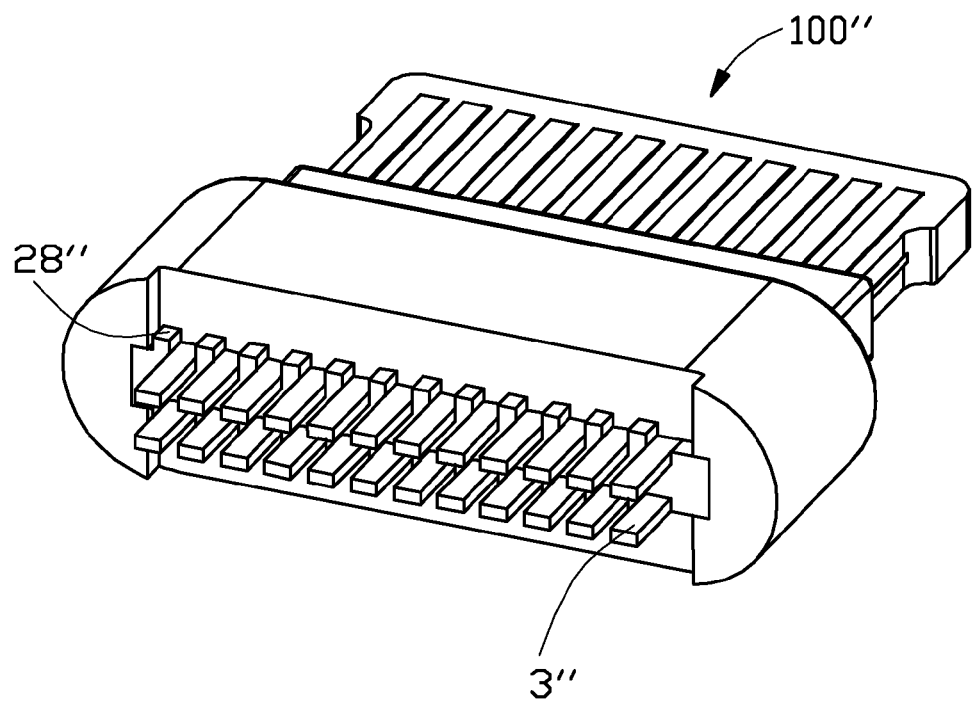
FIG. 9 is an assembled perspective view showing an electrical connector in accordance with a third embodiment of the present invention.
Figure 10:
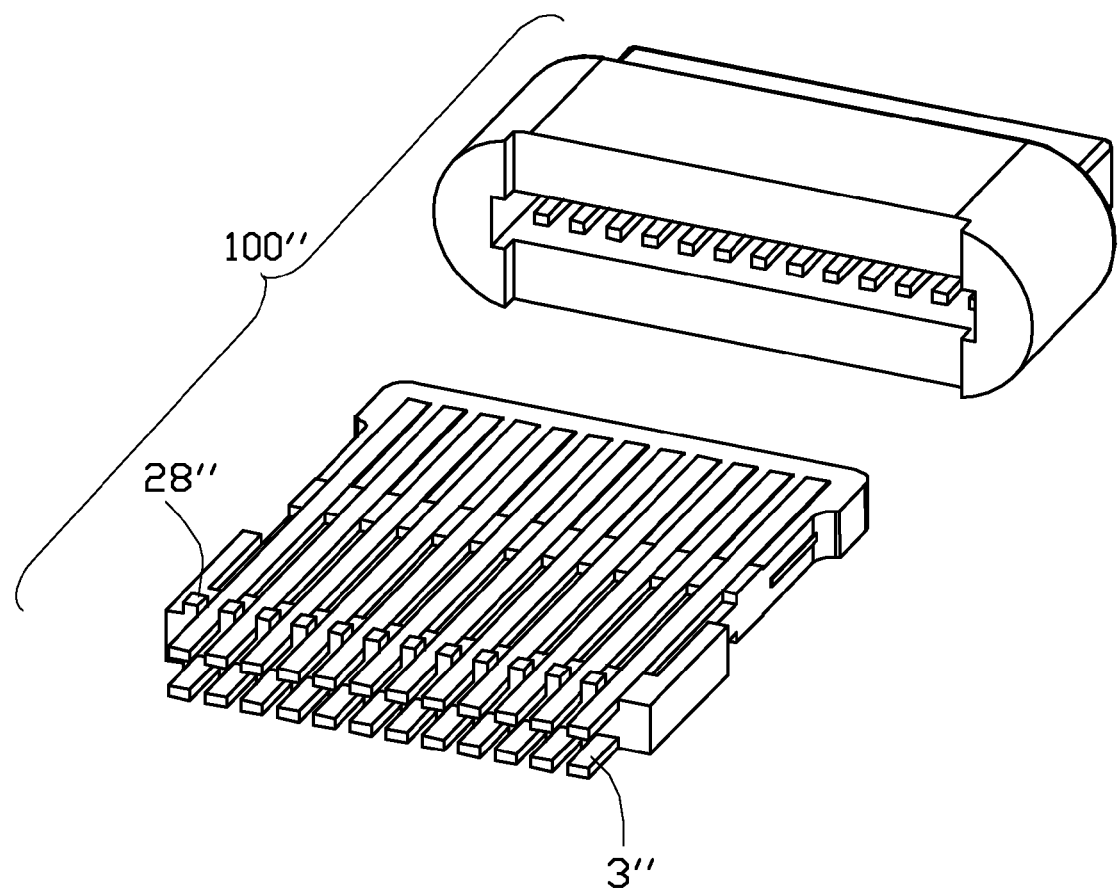
FIG. 10 is a partly exploded perspective view showing the electrical connector in accordance with the third embodiment the present invention.

Referring to FIGS. 9 and 10, as to the electrical connector 100" in a third embodiment, the maintaining faces 28" are formed into a plurality of protruding tabs alternating with the terminals 3" and exceeding the terminals 3" at the vertical direction, i.e., the top-to-bottom direction.

Figure 11:
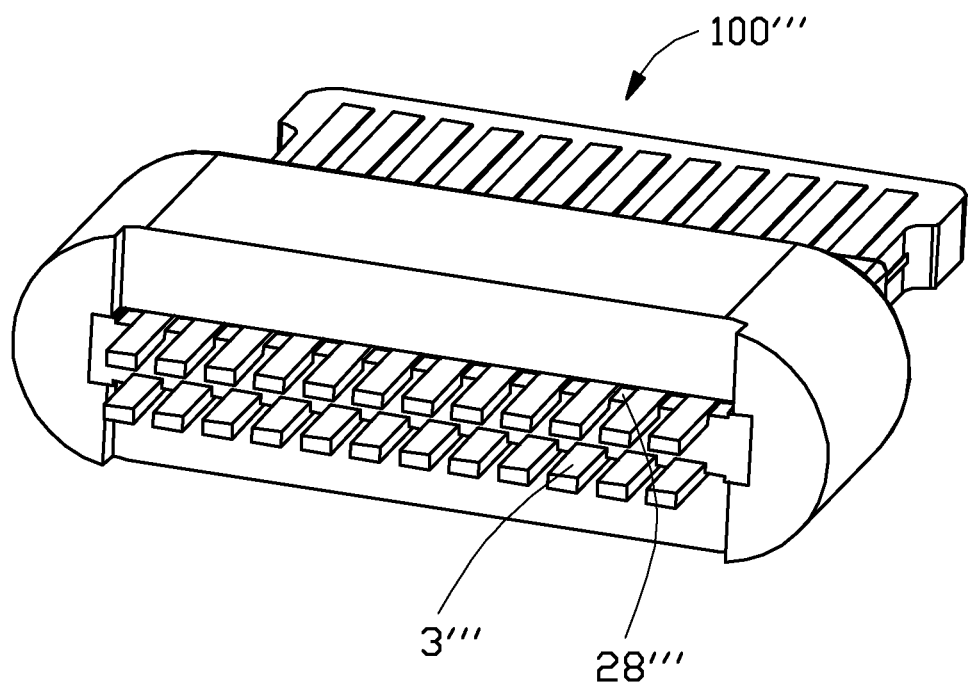
FIG. 11 is an assembled perspective view showing an electrical connector in accordance with a fourth embodiment of the present invention.
Figure 12:
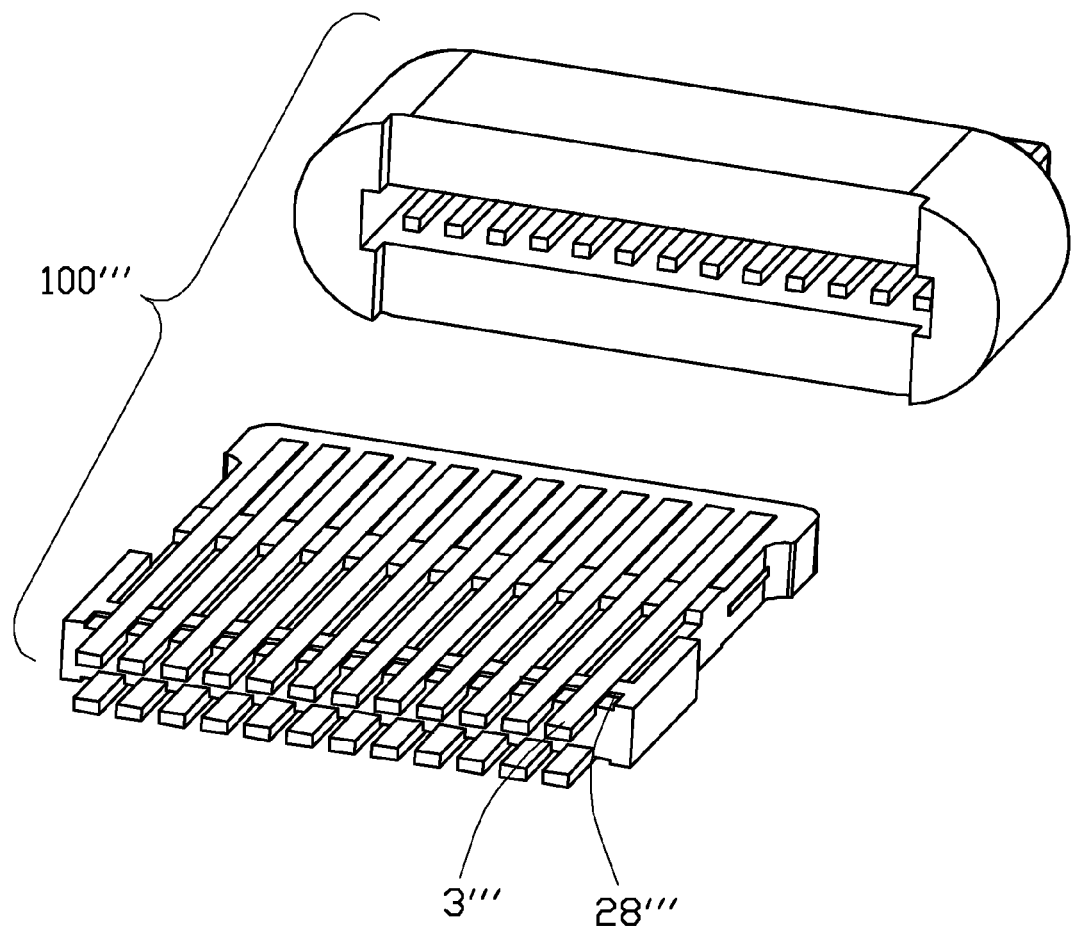
FIG. 12 is a partly exploded perspective view showing the electrical connector in accordance with the fourth embodiment the present invention.

Referring to FIGS. 11 and 12, as to the electrical connector 100''' in a fourth embodiment, the maintaining faces 28''' are formed into a plurality of concave cutouts alternating with the terminals 3'''. The upper faces of upper row of terminals 3''' and lower faces of lower row of terminals 3''' exceed the maintaining faces 28''' at the vertical direction, respectively.

It is to be understood, however, that even though numerous characteristics and advantages of the present invention have been set forth in the foregoing description, together with details of the structure and function of the invention, and changes may be made in detail, especially in matters of shape, size, and arrangement of parts within the principles of the invention to the full extent indicated by the broad general meaning of the terms in which the appended claims are expressed.

What is claimed is:

1. An electrical connector comprising:
   a shielding plate;
   a base portion insert molded with the shielding plate and defining two rows of passageways extending in the base portion along a front-to-back direction, said two rows of passageways exposed completely upwardly and downwardly, respectively;
   two rows of terminals assembled into the corresponding passageways of the base portion, each terminal including a body portion accommodated in the corresponding passageway, a soldering portion, and a contacting beam having a contacting portion, said shielding plate located between said two rows of terminals; and
   an insulative housing over molded around the base portion.

2. The electrical connector as claimed in claim 1, wherein one row of the terminals conversely correspond to the other row of the terminals.

3. The electrical connector as claimed in claim 1, wherein said terminals are assembled into the passageways in a vertical direction.

4. The electrical connector as claimed in claim 3, wherein the contacting beam of the terminals are cantilevered forwardly from the insulative housing and project toward each other, the soldering portion extending from the insulative housing, and said insulative housing comprises a pair of covering portions covering on upper and lower faces of the base portion and two opposite lateral sides of base portion are exposed and not covered with the insulative housing.

5. The electrical connector as claimed in claim 4, wherein said shielding plate is made from a metal plate, said shielding plate having a front portion extending forwardly from the insulative housing, the front portion positioned between the two rows of contacting beams of the terminals and disposed behind the contacting portions.

6. The electrical connector as claimed in claim 1, wherein said base portion includes a pair of divided portions and a connecting portion connected with the pair of divided portions arranged along a front-to-back direction, each divided portion is formed with two rows of ribs, and each passageway is defined between two adjacent ribs.

7. The electrical connector as claimed in claim 6, wherein the connecting portion is formed with a plurality of protrusions and a plurality of recesses alternating with the protrusions and communicating with the passageways.

8. The electrical connector as claimed in claim 1, wherein the contacting beams of the terminals are in a plate shape and received in the passageways together with the body portions, the insulative housing covers a rear end of the base portion and the contacting beams extend from the insulative housing.

9. The electrical connector as claimed in claim 8, wherein the terminals are assembled in the corresponding passageways in a back-to-front direction.

10. The electrical connector as claimed in claim 1, wherein the base portion defines a plurality of maintaining faces respectively at upper and lower faces thereof for supporting molds, the rear face of the insulative housing concaved forwardly to form a hollow, and the maintaining faces are exposed outwardly from the insulative housing and located in the hollow.

11. The electrical connector as claimed in claim 10, wherein the maintaining faces are flush with flat faces of the terminals at horizontal plane.

12. The electrical connector as claimed in claim 10, wherein the maintaining faces are formed into a plurality of protruding tabs alternating with the terminals and exceeding the terminals at the vertical direction.

13. The electrical connector as claimed in claim 10, wherein the maintaining faces are formed into a plurality of concaved cutouts alternating with the terminals, and the upper and lower faces of the terminals exceed the maintaining faces at the vertical direction.

14. A method of manufacturing an electrical connector, comprising the steps of:
providing a shielding plate and two rows of terminals, each terminal including a body portion, a soldering portion, and a contacting beam having a contacting portion, wherein the shielding plate is located between the two rows of terminals;
insert molding a base portion on the shielding plate, said base portion defining two rows of passageways exposed completely upwardly and downwardly, respectively;
assembling the terminals into the passageways after the step of insert molding, wherein the contacting beam and the body portion are received in the corresponding passageways; and
over molding an insulative housing on the base portion after the step of assembling so as to completely retain the terminals in the electrical connector.

15. An electrical connector comprising:
an insulative base portion forming upper and lower passageways on thereon opposite upper and lower faces in a vertical direction, said upper passageways and said lower passageways commonly arranged in a transverse direction perpendicular to said vertical direction, while each of said upper passageways and said lower passageways extending along a front-to-back direction perpendicular to both said vertical direction and said transverse direction;
a plurality of upper contacts assembled into and disposed within the corresponding upper passageways from an exterior, respectively, seated upon the upper face, and exposed to the exterior in the vertical direction;
a plurality of lower contacts assembled into and disposed within the corresponding lower passageways from the exterior, respectively, seated upon the lower face, and exposed to the exterior in the vertical direction;
a metallic shielding plate embedded within said base portion and extending along a plane defined by said front direction and said transverse direction, said shielding plate being insert-molded, via an insert molding process, within the base portion with a plurality of tails exposed to the exterior outside of a rear side of the base portion; and
an insulative housing applied upon the base portion, via an over-molding process, not only to form a complete contour of a whole insulative assembly in a secured manner but also to cover at least either the upper contacts and the lower contacts in the vertical direction.

16. The electrical connector as claimed in claim 15, wherein the upper contacts are covered by the housing in the vertical direction and are inserted into the corresponding upper passageways, respectively, along the vertical direction.

17. The electrical connector as claimed in claim 15, wherein the housing essentially surrounds the base portion, viewed along the front-to-back direction.

\* \* \* \* \*